(12) United States Patent
Wang et al.

(10) Patent No.: US 11,712,797 B2
(45) Date of Patent: *Aug. 1, 2023

(54) DUAL HAND DETECTION IN TEACHING FROM DEMONSTRATION

(71) Applicant: FANUC CORPORATION, Yamanashi (JP)

(72) Inventors: Kaimeng Wang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 498 days.

This patent is subject to a terminal disclaimer.

(21) Appl. No.: 17/018,674

(22) Filed: Sep. 11, 2020

(65) Prior Publication Data

US 2022/0080580 A1 Mar. 17, 2022

(51) Int. Cl.
*G06K 9/62* (2022.01)
*B25J 9/00* (2006.01)
(Continued)

(52) U.S. Cl.
CPC .............. *B25J 9/0081* (2013.01); *B25J 9/161* (2013.01); *B25J 9/1612* (2013.01); *B25J 13/08* (2013.01);
(Continued)

(58) Field of Classification Search
CPC ........ B25J 9/0081; B25J 9/161; B25J 9/1612; B25J 13/08; B25J 19/023; B25J 9/1664; B25J 9/1697; G06T 7/74; G06T 2207/20021; G06T 2207/20081; G06T 2207/20084; G06T 2210/22; G06T 7/75; G06T 2207/30196; G06V 10/82;
(Continued)

(56) References Cited

U.S. PATENT DOCUMENTS 8,467,904 B2 * 6/2013 Dariush .................. G06T 7/277
700/262
9,753,453 B2 * 9/2017 Benaim ................... G06F 30/00
(Continued)

OTHER PUBLICATIONS

Hidalgo, Gines; Cao, Zhe; Simon, Tomas; Wei, Shih-En; Joo, Hanbyul; Sheikh, Yaser. (https://github.com/CMU-Perceptual-Computing-Lab/openpose).

*Primary Examiner* — Harry Y Oh
(74) *Attorney, Agent, or Firm* — John A. Miller; Shumaker, Loop & Kendrick LLP

(57) ABSTRACT

A method for dual hand detection in robot teaching from human demonstration. A camera image of the demonstrator's hands and workpieces is provided to a first neural network which determines the identity of the left and right hand of the human demonstrator from the image, and also provides cropped sub-images of the identified hands. The first neural network is trained using images in which the left and right hands are pre-identified. The cropped sub-images are then provided to a second neural network which detects the pose of both the left and right hand from the images, where the sub-image for the left hand is horizontally flipped before and after the hand pose detection if second neural network is trained with right hand images. The hand pose data is converted to robot gripper pose data and used for teaching a robot to perform an operation through human demonstration.

20 Claims, 6 Drawing Sheets

(51) Int. Cl.
*B25J 9/16* (2006.01)
*B25J 13/08* (2006.01)
*G06T 7/73* (2017.01)
*B25J 19/02* (2006.01)

(52) U.S. Cl.
CPC ............. *B25J 19/023* (2013.01); *G06T 7/74* (2017.01); *G06T 2207/20021* (2013.01); *G06T 2207/20081* (2013.01); *G06T 2207/20084* (2013.01); *G06T 2210/22* (2013.01)

(58) Field of Classification Search
CPC ........ G06V 20/10; G06V 40/28; G06F 18/24; G06N 3/045; G06N 3/08
See application file for complete search history.

(56) References Cited

U.S. PATENT DOCUMENTS

| | | | |
|---|---|---|---|
| 10,416,776 B2* | 9/2019 | Dash | G06F 3/011 |
| 2004/0193413 A1* | 9/2004 | Wilson | H04N 13/239 |
| | | | 382/209 |
| 2008/0025475 A1* | 1/2008 | White | A61B 6/04 |
| | | | 378/208 |
| 2009/0132088 A1* | 5/2009 | Taitier | G05B 19/42 |
| | | | 700/264 |
| 2013/0236089 A1* | 9/2013 | Litvak | G06V 40/11 |
| | | | 382/154 |
| 2018/0284882 A1* | 10/2018 | Shipes | G06F 3/0346 |
| 2019/0272675 A1* | 9/2019 | Wagner | H04N 23/57 |
| 2019/0291277 A1* | 9/2019 | Oleynik | B25J 9/1697 |
| 2019/0361719 A1* | 11/2019 | Vangala | G06F 16/243 |
| 2020/0201358 A1* | 6/2020 | Corsica | B64C 39/024 |
| 2021/0086364 A1* | 3/2021 | Handa | G06T 1/0014 |
| 2021/0120315 A1* | 4/2021 | Makinen | H04N 21/236 |
| 2021/0192197 A1* | 6/2021 | Zhao | G06V 10/764 |
| 2021/0201661 A1* | 7/2021 | Al Jazaery | G08C 23/00 |

* cited by examiner

DUAL HAND DETECTION IN TEACHING FROM DEMONSTRATION

BACKGROUND

Field

The present disclosure relates to the field of industrial robot programming and, more particularly, to a method for determining the identity of the left and right hand of a human demonstrator from camera images, then detecting the pose of both the left and right hand from the images, where the hand identity and pose data is used for teaching or programming a robot to perform an operation through human demonstration.

Discussion of the Related Art

The use of industrial robots to repeatedly perform a wide range of manufacturing, assembly and material movement operations is well known. However, teaching a robot to perform even a fairly simple operation—such as picking up a workpiece in a random position and orientation on a conveyor and moving the workpiece to a container—has been problematic using conventional methods.

One traditional method of robot teaching includes an operator using a teach pendant to instruct the robot to make incremental moves—such as "jog in the X-direction" or "rotate gripper about local Z-axis"—until the robot and it's gripper are in the correct position and orientation to perform an operation, then storing the operation data, and repeating this many times. Another known technique of teaching a robot to perform an operation is the use of a motion capture system in conjunction with human demonstration. Because robot programming using teach pendants and motion capture systems has been found to be unintuitive, time-consuming and/or costly, techniques for robot teaching from human demonstration using camera images have been developed.

In some types of operations, such as assembly of a device comprising many components, a human naturally uses two hands to perform the operational tasks. In order for robot teaching to be accurate in these cases, it is necessary for the left and right hand of the human demonstrator to be reliably detected. One known method for determining the identity of the left and right hand of a human demonstrator involves providing camera images of the entire body of the human, performing anthropomorphic analysis of the images to identify the left and right arms, and then identifying the left and right hands based on the arm identities. However, this technique requires separate camera images for the identification of the arms/hands than the images needed for hand pose detection, and furthermore requires additional computational steps for the body skeleton analysis.

Other techniques which could be employed for identifying the left and right hand of the human demonstrator involve requiring each hand to maintain a relative position with respect to the other, or requiring each hand to remain within a positional boundary for all teaching operations. However, these techniques place untenable constraints on the natural hand movements of the human demonstrator, and risk misidentification of the hands if the constraints are violated.

In light of the circumstances described above, there is a need for an improved technique for dual hand detection in robot teaching from human demonstration.

SUMMARY

In accordance with the teachings of the present disclosure, a method for dual hand detection in robot teaching from human demonstration is described and illustrated. A camera image of the demonstrator's hands and workpieces is provided to a first neural network which determines the identity of the left and right hand of the human demonstrator from the image, and also provides cropped sub-images of the identified hands. The first neural network is trained using images in which the left and right hands are pre-identified. The cropped sub-images are then provided to a second neural network which detects the pose of both the left and right hand from the images, where the sub-image for the left hand is horizontally flipped before and after the hand pose detection if second neural network is trained with right hand images. The hand pose data is converted to robot gripper pose data and used for teaching a robot to perform an operation through human demonstration.

Additional features of the presently disclosed devices and methods will become apparent from the following description and appended claims, taken in conjunction with the accompanying drawings.

DETAILED DESCRIPTION OF THE EMBODIMENTS

Figure 1:
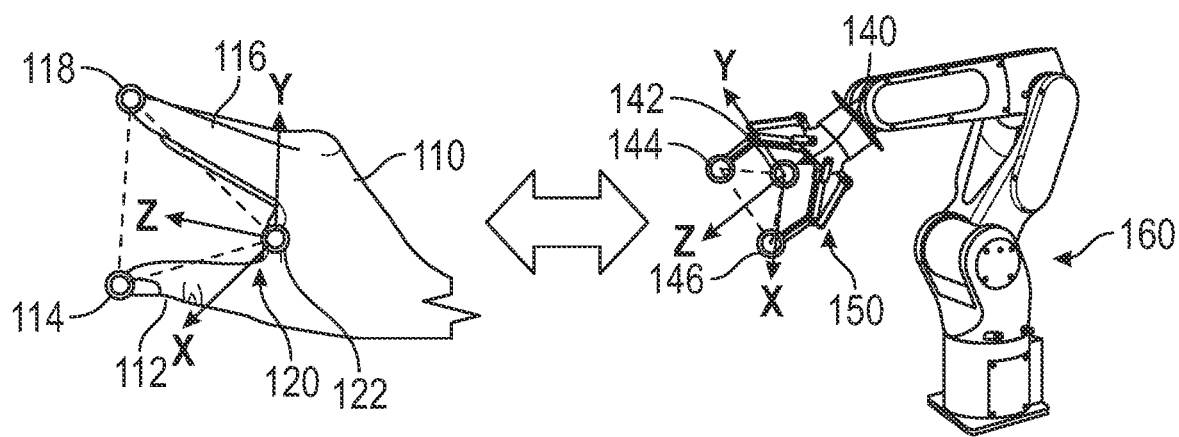
FIG. 1 is an illustration of how images of a human hand are analyzed to determine a corresponding position and orientation of a finger-type robotic gripper, according to an embodiment of the present disclosure.

The following discussion of the embodiments of the disclosure directed to dual hand detection in teaching a robot by human demonstration is merely exemplary in nature, and is in no way intended to limit the disclosed devices and techniques or their applications or uses.

It is well known to use industrial robots for a variety of manufacturing, assembly and material movement operations. One known type of robotic operation is sometimes known as "pick, move and place", where a robot picks up a part or workpiece from a first location, moves the part and places it at a second location. The first location is often a conveyor belt where randomly oriented parts are streaming, such as parts which were just taken from a mold. The second location may be another conveyor leading to a different operation, or may be a shipping container, but in either case, the part needs to be placed at a particular location and oriented in a particular pose at the second location. Other robotic operations—such as assembly of multiple components into a device such as a computer chassis—similarly require parts to be picked up from one or more sources and placed in precise positions and orientations.

In order to perform operations of the type described above, a camera is typically used to determine the position and orientation of incoming parts, and a robot must be taught to grasp the part in a specific manner using a finger-type gripper or a magnetic or suction cup gripper. Teaching the robot how to grasp the part according to the part's orientation has traditionally been done by a human operator using a teach pendant. The teach pendant is used by the operator to instruct the robot to make incremental moves—such as "jog in the X-direction" or "rotate gripper about local Z-axis"—until the robot and its gripper are in the correct position and orientation to grasp the workpiece. Then the robot configuration and the workpiece position and pose are recorded by the robot controller to be used for the "pick" operation. Similar teach pendant commands are then used to define the "move" and "place" operations. However, the use of a teach pendant for programming a robot is often found to be unintuitive, error-prone and time-consuming, especially to non-expert operators.

Another known technique of teaching a robot to perform a pick, move and place operation is the use of a motion capture system. A motion capture system consists of multiple cameras arrayed around a work cell to record positions and orientations of a human operator and a workpiece as the operator manipulates the workpiece. The operator and/or the workpiece may have uniquely recognizable marker dots affixed in order to more precisely detect key locations on the operator and the workpiece in the camera images as the operation is performed. However, motion capture systems of this type are costly, and are difficult and time-consuming to set up and configure precisely so that the recorded positions are accurate.

Techniques have been developed which overcome the limitations of existing robot teaching methods described above—including methods which use a single camera to capture images of a human performing natural part grasping and movement actions, where images of the person's hand and its position relative to the part are analyzed to generate robotic programming commands.

FIG. 1 is an illustration of how images of a human hand are analyzed to determine a corresponding position and orientation of a finger-type robotic gripper, according to an embodiment of the present disclosure. A hand 110 has a hand coordinate frame 120 defined as being attached thereto. The hand 110 includes a thumb 112 with a thumb tip 114, and a forefinger 116 with a forefinger tip 118. Other points on the thumb 112 and the forefinger 116 may also be identified in the camera images, such as the locations of the base of the thumb 112 and the forefinger 116 and the first knuckle of the thumb 112 and the forefinger 116, etc.

A point 122 is located midway between the base of the thumb 112 and the base of the forefinger 116, where the point 122 is defined as the origin of the hand coordinate frame 120. The orientation of the hand coordinate frame 120 may be defined using any convention which is suitable for correlation to the robotic gripper orientation. For example, the Y axis of the hand coordinate frame 120 may be defined as being normal to the plane of the thumb 112 and the forefinger 116 (that plane being defined by the points 114, 118 and 122). Accordingly, the X and Z axes lie in the plane of the thumb 112 and the forefinger 116. Further, the Z axis may be defined as bisecting the angle made by the thumb 112 and the forefinger 116 (the angle 114-122-118). The X axis orientation may then be found by the right hand rule from the known Y and Z axes. As mentioned above, the conventions defined here are merely exemplary, and other coordinate frame orientations may be used instead. The point is that a coordinate frame position and orientation may be defined based on key recognizable points on the hand, and that coordinate frame position and orientation can be correlated to a robotic gripper position and orientation.

A camera (not shown in FIG. 1; discussed later) may be used to provide images of the hand 110, where the images can then be analyzed to determine the spatial positions (such as in a work cell coordinate frame) of the thumb 112 and the forefinger 116, including the thumb tip 114 and the forefinger tip 118 along with the knuckles, and therefore the origin location 122 and orientation of the hand reference frame 120. In FIG. 1, the location and orientation of the hand reference frame 120 are correlated to a gripper coordinate frame 140 of a gripper 150 attached to a robot 160. The gripper coordinate frame 140 has an origin 142 which corresponds to the origin 122 of the hand reference frame 120, and points 144 and 146 which correspond to the forefinger tip 118 and the thumb tip 114, respectively. Thus, the two fingers of the finger-type gripper 150 are in the X-Z plane of the gripper coordinate frame 140, with the Z axis bisecting the angle 146-142-144.

The origin 142 of the gripper coordinate frame 140 is also defined as the tool center point of the robot 160. The tool center point is a point whose location and orientation are known to the robot controller, where the controller can provide command signals to the robot 160 to move the tool center point and its associated coordinate frame (the gripper coordinate frame 140) to a defined location and orientation.

Figure 2:
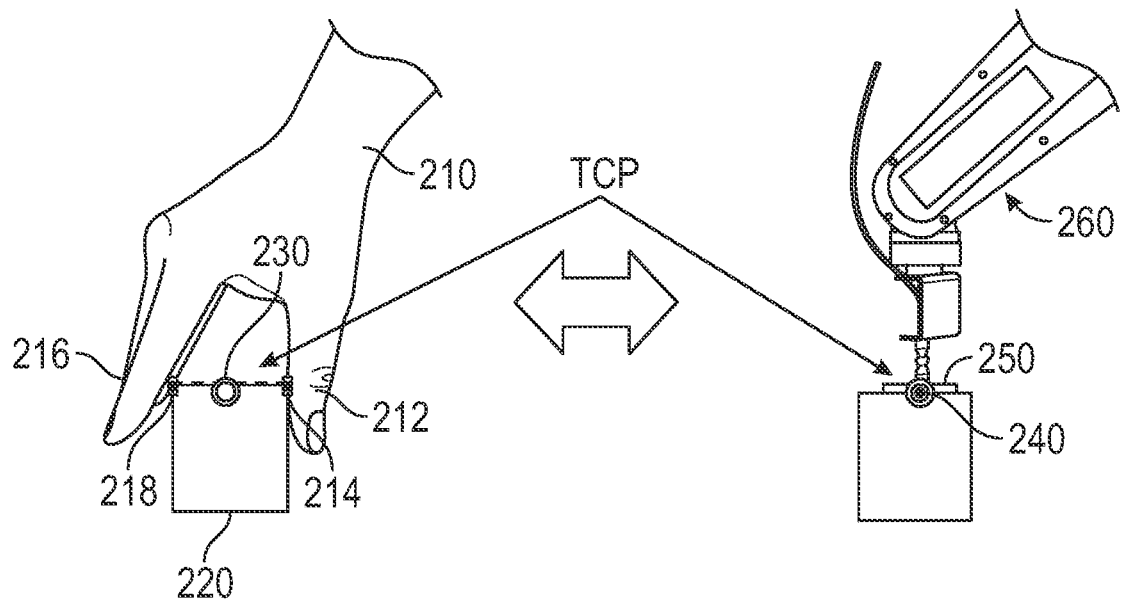
FIG. 2 is an illustration of how images of a human hand are analyzed to determine a corresponding position and orientation of a magnetic or suction cup type robotic gripper, according to an embodiment of the present disclosure.

FIG. 2 is an illustration of how images of a human hand are analyzed to determine a corresponding position and orientation of a magnetic or suction cup type robotic gripper, according to an embodiment of the present disclosure. Whereas FIG. 1 showed how a hand pose can be correlated to an orientation of a mechanical gripper with movable fingers, FIG. 2 shows how the hand pose can be correlated to a flat gripper (circular, for example) which picks up a part by a flat surface of the part with either suction force or magnetic force.

A hand 210 again includes a thumb 212 and a forefinger 216. A point 214 is located where the thumb 212 makes contact with a part 220. A point 218 is located where the forefinger 216 makes contact with the part 220. A point 230 is defined as existing midway between the points 214 and 218, where the point 230 corresponds to a tool center point (TCP) 240 of a surface gripper 250 on a robot 260. In the case of the surface gripper 250 shown in FIG. 2, the plane of the gripper 250 may be defined as the plane containing the line 214-218 and perpendicular to the plane of the thumb 212 and the forefinger 216 based on detection of knuckle joints and fingertips. The tool center point 240 of the gripper 250 corresponds to the point 230, as stated above. This fully defines a location and orientation of the surface gripper 250 corresponding to the position and pose of the hand 210.

Techniques for teaching a robot to perform operations based on human demonstration—particularly based on analysis of images of a human hand and workpiece by a camera—were described in U.S. patent application Ser. No. 16/843,185, titled "ROBOT TEACHING BY HUMAN DEMONSTRATION", filed Apr. 8, 2020 and commonly assigned to the present application; the Ser. No. 16/843,185 application (hereinafter "the '185 application") is hereby incorporated by reference in its entirety. Among other things, the '185 application discloses techniques for determining the 3D coordinates of the key points of a single hand (knuckle joints, etc.) from a camera image of the hand.

In some types of operations, such as assembly of a device comprising several components, a human demonstrator naturally uses two hands to perform the operational tasks. In order for robot teaching to be accurate in these cases, it is necessary for the left and right hand of the human demonstrator to be reliably identified in the images. One known method for determining the identity of the left and right hand of a human demonstrator involves providing camera images of the entire body of the human, performing anthropomorphic analysis of the images of the body to identify the left and right arms, and then identifying the left and right hands based on the arm identities. However, this technique requires separate camera images for the identification of the arms/hands than the images needed for hand pose detection, and furthermore requires additional computational steps for the body skeleton analysis. Other two-handed teaching methods prohibit the human demonstrator from crossing the hands over each other to their "opposite sides".

Using the key point detection methods of the '185 application, the present disclosure describes techniques for reliably determining the identity, position and pose of both hands of a human demonstrator in camera images, without placing artificial restrictions on the demonstrator's use or movement of his/her hands, and without requiring full-body images and analysis, as required in existing methods.

Figure 3:
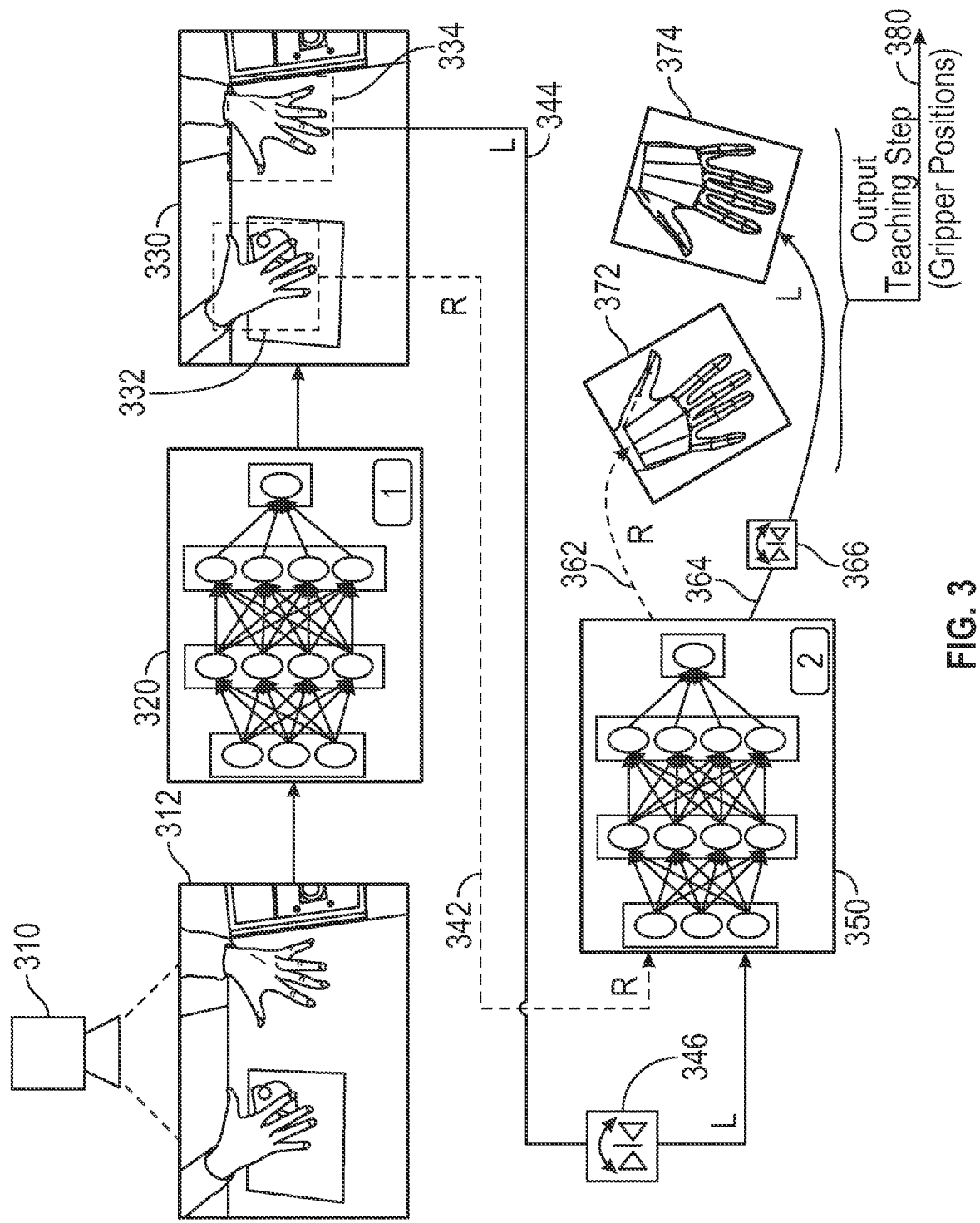
FIG. 3 is an illustration of a system and steps for identifying hand position and pose from camera images of both hands of a human demonstrator, according to an embodiment of the present disclosure.

FIG. 3 is an illustration of a system and steps for identifying hand position and pose from camera images of both hands of a human demonstrator, according to an embodiment of the present disclosure. A camera 310 provides images of a training workspace—that is, the camera 310 provides images of an area the hands of the operator will occupy while performing the teaching demonstration. The training workspace might be a tabletop on which a device is being assembled, for example. The camera 310 is preferably a two-dimensional (2D) camera providing color images of the training workspace, but not providing depth information as would a 3D camera.

The camera 310 provides an image 312 as depicted in FIG. 3. Processing of the image 312 is described in detail in FIG. 3. The camera 310 provides a continuous stream of images, where each of the images is processed as shown in FIG. 3 to provide a complete motion sequence to be used by a robot—such as picking up a part, moving it to a new location, and placing it in a desired pose. The human demonstrator is at the top of the image 312, so the right hand appears at the left of the image 312 and the left hand appears at the right of the image 312.

The image 312 is analyzed by a $1^{st}$ neural network 320 to determine the identity of the left and right hands and their respective location in the image 312. The $1^{st}$ neural network 320—able to identify the left and right hands in an image of just the hands (not the entire body)—provides a capability not available in prior hand image analysis systems. The $1^{st}$ neural network 320 identifies the left and right hands, regardless of the relative location of the hands in the image 312, based on cues such as finger curvature (the fact that the fingers of a human hand can only curl in one direction) and relative position of fingers and thumb. With proper training (discussed below with respect to FIG. 4), the $1^{st}$ neural network 320 has been demonstrated to quickly and reliably determine the identities and the locations of the left and right hands in the image 312.

Based on the output of the $1^{st}$ neural network 320 at box 330, a cropped image 332 of the right hand and a cropped image 334 of the left hand are created. Again, the image 332 of the right hand and the image 334 of the left hand are determined based on the actual identities of the hands through image analysis by the $1^{st}$ neural network 320, not based simply on the locations of the hands in the image 310/312. That is, the hands could be crossed over in some images so that the left and right hands appear in the opposite of the expected "normal" location.

The image 332 of the right hand and the image 334 of the left hand are cropped tightly around the hand as shown, in order to provide the greatest amount of image resolution and the least amount of superfluous data for subsequent analysis. The image 332 of the right hand is provided on a line 342 to a $2^{nd}$ neural network 350. The $2^{nd}$ neural network 350 analyzes the image 332 to determine the three-dimensional (3D) coordinates of numerous key points on the right hand. The key points include finger tips, finger knuckles, thumb tip and thumb knuckles. The $2^{nd}$ neural network 350 is trained using many images of a particular hand (assumed to be a right hand for the purposes of this discussion). Techniques for determining the 3D coordinates of the key points on a hand from an image of the hand of known identity (left or right) were disclosed in the Ser. No. 16/843,185 application referenced above.

The image 334 of the left hand is provided on a line 344. In the case where the $2^{nd}$ neural network 350 is trained to recognize key points in images of a right hand, the image 334 of the left hand must be horizontally flipped at box 346 before being provided to the $2^{nd}$ neural network 350. The $2^{nd}$ neural network 350 analyzes the flipped version of the image 334 to determine the three-dimensional (3D) coordinates of numerous key points (finger tips, knuckles, etc.) on the left hand. Because the image 334 has been horizontally flipped, the $2^{nd}$ neural network 350 can accurately analyze the flipped image 334 as if it were an image of a right hand.

To be clear, the $2^{nd}$ neural network 350 may be trained using images of either left or right hands. If right hand images are used to train the $2^{nd}$ neural network 350, then images of the left hand must be flipped for processing by the $2^{nd}$ neural network 350, and vice versa.

On line 362, the 3D "wireframe" structure of the right hand is provided to box 372. As discussed in detail in the Ser. No. 16/843,185 application referenced above, the 3D wireframe structure of the hand output by the $2^{nd}$ neural network 350 includes the key points and connectivity (e.g., index finger bone segment connecting finger tip at coordinates X1/Y1/Z1 to first knuckle at coordinates X2/Y2/Z2, etc.) of as much of the structure of the hand as can be determined based on visibility in the original image. That is, the locations of fingers or portions of fingers which are curled under and occluded from view in the image cannot be resolved.

On line 364, the 3D wireframe structure of the left hand is output from the $2^{nd}$ neural network 350. The horizontal coordinates (typically the X coordinates) of the left hand key points must be flipped at box 366 before being provided to box 374. The horizontal flip at the box 366 must be about the same mirror plane (e.g., Y-Z plane) as the original image flip at the box 346.

As a result of the image analysis described above, the box 372 contains the 3D wireframe structure of the right hand (3D coordinates of tip and knuckle points on fingers and thumb), and the box 374 likewise contains the 3D wireframe structure of the left hand. Using the 3D coordinate data from the hands, gripper coordinates can be computed as shown in FIGS. 1 and 2 and discussed above. In this way, the gripper positions and poses are computed and are then output on line 380.

Figure 4:
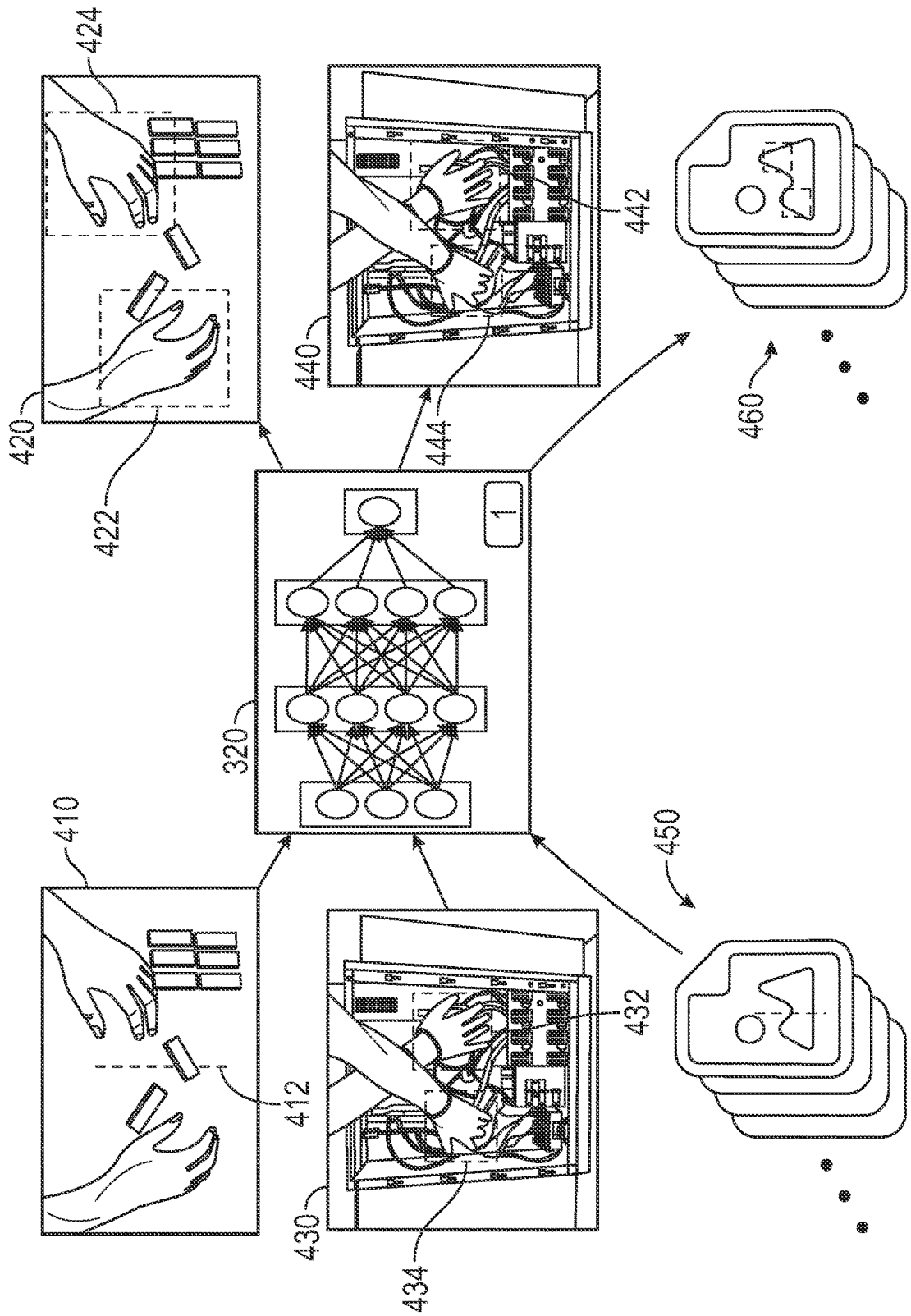
FIG. 4 is an illustration of steps for training a hand detection and identification neural network used in the system of FIG. 3, according to an embodiment of the present disclosure.

FIG. 4 is an illustration of steps for training the hand detection and identification neural network 320 used in the system of FIG. 3, according to an embodiment of the present disclosure. The 1$^{st}$ neural network 320 is shown at the center of FIG. 4. The 1$^{st}$ neural network 320 is responsible for determining the identity and the location of the left and right hands in an image, as shown in FIG. 3 and discussed above. Training of the 1$^{st}$ neural network 320 to recognize a left hand versus a right hand is accomplished by providing many training images to the 1$^{st}$ neural network 320, where the left and right hands are in a predetermined relative position in the training images.

An image 410 is an example of a training image used to train the 1$^{st}$ neural network 320. The image 410 includes both the left and right hands of the human demonstrator, and the left and right hands are in a known relative position, such as being on designated sides of a dividing line, or identified in bounding boxes. One method of predetermining the positions of the left and right hands in the image 410 is for the hands to be in their "normal" relative positions (not crossed over at the wrists). Another method of predetermining the positions of the left and right hands in the image 410 is for the hands to be located on their respective sides of a dividing line 412. In the image 410, the dividing line 412 is at or near the image center, but this need not be the case. For a case where the hands are crossed over at the wrists, the positions of left and right hands are manually annotated in bounding boxes.

The 1$^{st}$ neural network 320 is a multi-layer neural network including an input layer, an output layer and usually two or more interior hidden layers, as known to those skilled in the art. The 1$^{st}$ neural network 320 is trained to recognize an image of a hand, and to recognize structural characteristics of the hands that distinguish a left hand from a right hand. The combination of several factors—such as the curvature of fingers (which can only curve one direction—toward the palm), relative location of thumb and fingers, etc.—can be used to distinguish top from bottom and left from right in a particular hand. Because the 1$^{st}$ neural network 320 knows the identities of left and right hands in advance of analyzing each image, the neural network 320 can automatically build its structure of layers and nodes to reliably correlate the structural features with the identity of the hands. In the process of training by analyzing multiple images, the 1$^{st}$ neural network 320 learns to recognize structural features which are characteristic of a right hand versus features which are characteristic of a left hand.

Output image 420 shows the results of the training from the image 410. A hand is detected and located in a box 422, and the 1$^{st}$ neural network 320 knows that it is a right hand based on its position relative to the dividing line 412. (The right hand of the human is on the left side of the image 410/420 because the body of the human is at the top of the image 410/420.) Similarly, a hand is detected and located in a box 424, and the 1$^{st}$ neural network 320 knows that it is a left hand based on its position. A technique for cropping a sub-image around the hands as shown by the boxes 422 and 424 is employed, where the sub-image is cropped to an area just including all visible finger tips and thumb tip, and a location identified as the wrist joint, for example.

An image 430 is another example of a training image used to train the 1$^{st}$ neural network 320. The image 430 again includes both the left and right hands of the human demonstrator, and the left and right hands are identified in bounding boxes. In the image 430, a bounding box 432 is provided as an annotation or indexing property identifying the right hand. The demonstrator's hands are crossed over in the image 430, so the right hand is located where the left had would be expected; however, because of the bounding box identification, the 1$^{st}$ neural network 320 knows that the hand in the bounding box 432 is the demonstrator's right hand. Similarly, a bounding box 434 is provided as an annotation or indexing property identifying the left hand.

Output image 440 shows the results of the training from the image 430. A hand is detected and located in a box 442 which is essentially the same as the bounding box 432, and the 1$^{st}$ neural network 320 knows that it is a right hand based on the bounding box information, even though the hands are crossed over. Similarly, a hand is detected and located in a box 444, and the 1$^{st}$ neural network 320 knows that it is a left hand based on the bounding box information. In the process of analyzing the hands in the boxes 442 and 444 in the image 430/440, the 1$^{st}$ neural network 320 is incrementally trained in hand identity detection.

The image 430 is very different from the image 410. The input images include different human demonstrators, different components, operations and backgrounds, gloves versus no gloves, and even somewhat different camera angles (point of view). These differences in the input training images help to train the 1$^{st}$ neural network 320 to robustly recognize hand structure and identity in the images that it will process in the actual execution phase of robot teaching.

Many other input images 450 are provided to the 1$^{st}$ neural network 320 for training. Each of the input images 450 results in an output image 460 in which the left and right hands have been located and identified, as shown in FIG. 4. After training, the 1$^{st}$ neural network 320 is ready to be used as shown in FIG. 3—to identify left and right hands in the image 312 (even if the hands are crossed over), and provide the cropped sub-images containing the properly identified hands. A test system has been developed which demonstrates the capability of a neural network such as the 1$^{st}$ neural network 320 to rapidly and accurately identify the right and left hands in images exactly as discussed above, even when the left and right hands are repeatedly overlapped, crossed over and uncrossed in a continuous sequence of images.

Figure 5:
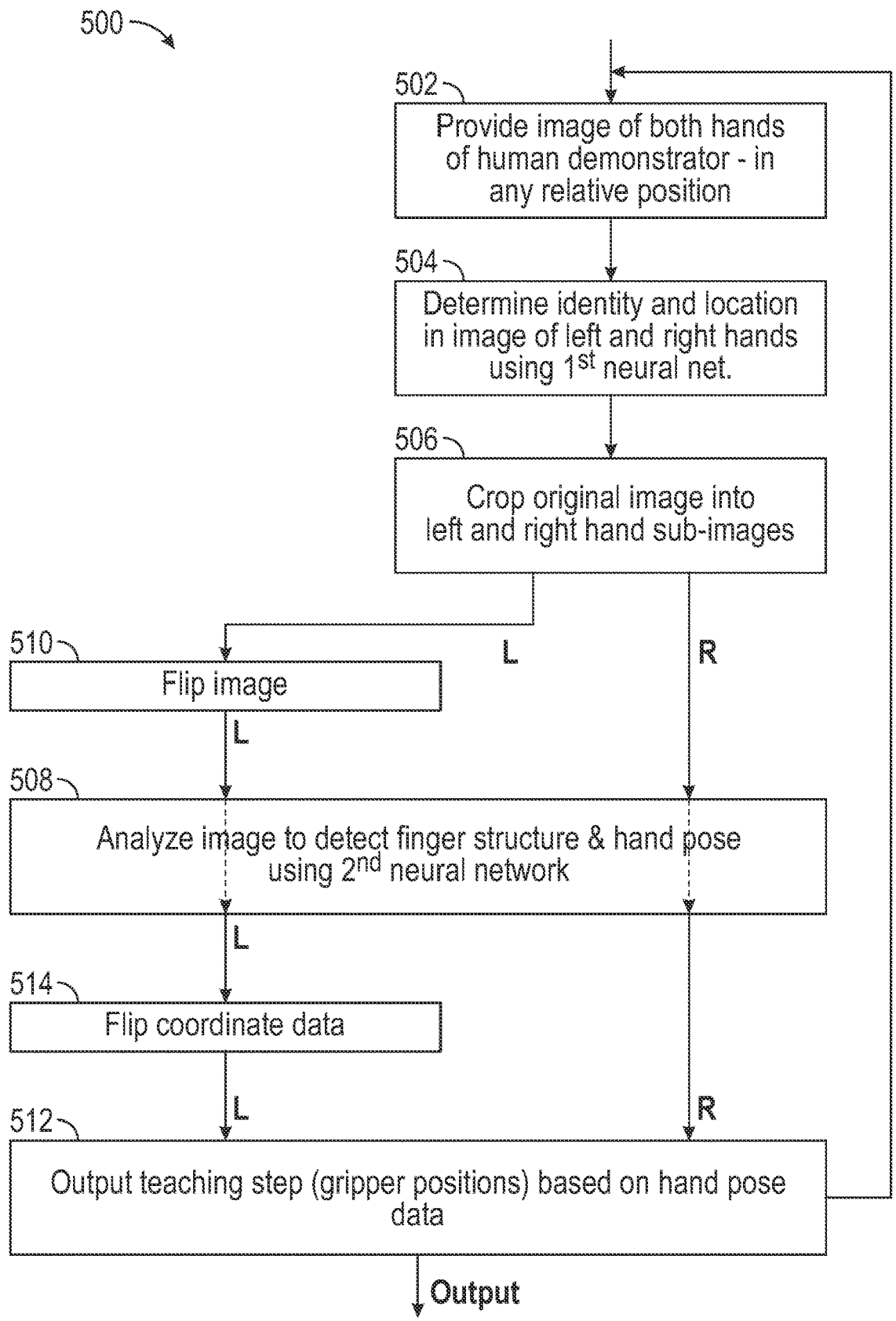
FIG. 5 is a flowchart diagram of a method for identifying hand position and pose from camera images of both hands of a human demonstrator, according to an embodiment of the present disclosure.

FIG. 5 is a flowchart diagram 500 of a method for identifying hand position and pose from camera images of both hands of a human demonstrator, according to an embodiment of the present disclosure. The flowchart diagram 500 depicts the method steps corresponding with the system block diagram of FIG. 3.

At box 502, an image containing both hands of the human demonstrator is provided. The image, such as the image 312 of FIG. 3, preferably does not include the entire body of the human. The image also need not have the left and right hands in their "normal" or "expected" relative position. The image depicts the human demonstrator performing an operation on one or more workpieces—such as assembling a device comprising multiple components, with both hands being used to pick and place individual components. In actual practice, images will be provided in rapid succession (multiple images per second) so that a sequence of spatial grasp and place operations can be taught. In addition to hand identity, position and pose, workpiece position and pose will also be determined from the images and used in conjunction with hand ("gripper") data for robot teaching.

At box 504, the 1$^{st}$ neural network 320 is used to determine the identity and location of the left and right hands in the provided image. The operations performed in the box 504 were discussed in detail above. At box 506, the original image is cropped into two sub-images, one containing the left hand and one containing the right hand. The identity of the hands is provided with the sub-images.

At box 508, the right hand sub-image is analyzed using the 2$^{nd}$ neural network 350 to detect the finger structure and hand pose. The operations performed in the box 508 were discussed above, and were described in detail in the Ser. No. 16/843,185 patent application referenced earlier. Because the 2$^{nd}$ neural network 350 has been trained to detect hand structure using images of either right hands or left hands, it is required that the sub-images are properly identified before analysis in the 2$^{nd}$ neural network 350. In the flowchart diagram 500, it is assumed that the 2$^{nd}$ neural network 350 has been trained using right hand images; thus, the right hand sub-image from the box 506 is passed directly to the box 508.

At box 510, the left hand sub-image is flipped horizontally before being provided to the box 508 for analysis. Again, it is assumed that the 2$^{nd}$ neural network 350 has been trained using right hand images; thus, the left hand sub-image from the box 506 must be horizontally flipped before it is passed on to the box 508. The reverse procedure is equally applicable—where the 2$^{nd}$ neural network 350 is trained using images of left hands, and the right hand sub-image is flipped before analysis.

At box 512, the finger structure and hand pose data (3D coordinates of hand skeleton key points) for the right hand is used to compute a corresponding gripper pose and the gripper pose is output (along with workpiece pose data) as a robot teaching step. A complete method for robot teaching from images of a human demonstration (hands and workpieces) is discussed below.

At box 514, the horizontal coordinate (e.g., X coordinate) of the finger structure and hand pose data from the box 508 for the left hand is flipped before being used at the box 512 to compute a corresponding gripper pose and the gripper pose is output as a robot teaching step. The horizontal coordinate data must be flipped or mirrored relative to a mirror plane to put the 3D hand coordinate data back in its proper location from the original input image.

As would be understood by one skilled in the art, the positions of the left and right hand sub-images within the original input image must be known throughout the computation of the 3D coordinates of hand pose. Furthermore, the pixel coordinates of the original provided image must be mapped to the physical workspace within which the demonstration is occurring, so that 3D gripper and workpiece positions and poses can be computed from image pixel coordinates.

From the box 512, the robot teaching step is output and recorded for robot programming. The teaching step includes gripper positions and poses computed from both left and right hand pose coordinate data, and corresponding workpiece positions and poses. The process then loops back to the box 502 to receive another input image.

Figure 6:
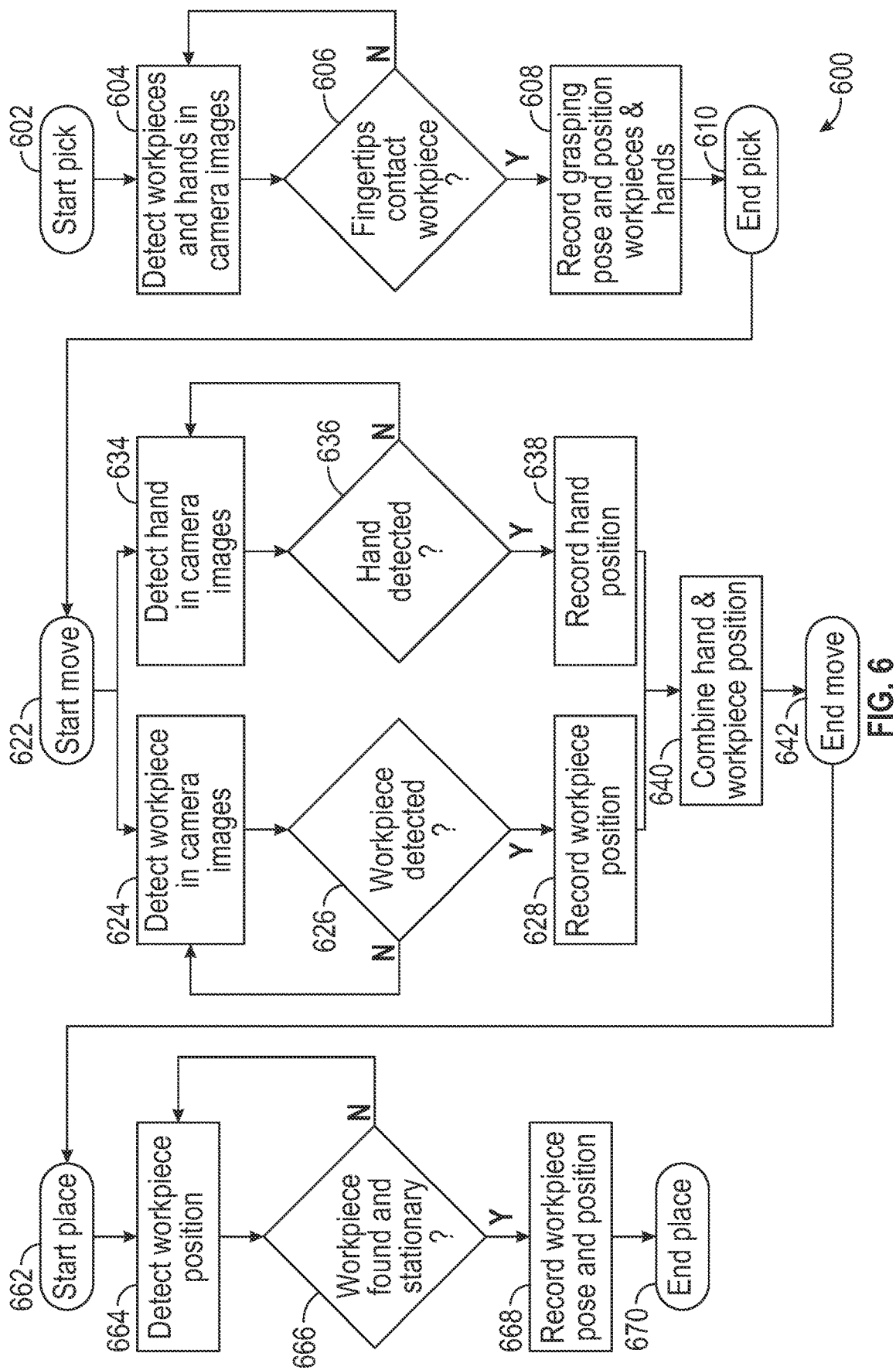
FIG. 6 is a flowchart diagram of a method for teaching a robot to perform an operation using camera images of both hands of a human demonstrator and corresponding workpieces, according to an embodiment of the present disclosure.

FIG. 6 is a flowchart diagram 600 of a method for teaching a robot to perform an operation using camera images of both hands of a human demonstrator and corresponding workpieces, according to an embodiment of the present disclosure. The flowchart diagram 600 is arranged in three vertical columns, corresponding with a Pick step (at the right), a Move step (center) and a Place step (at the left). The three individual steps illustrate how images of hands and workpieces are analyzed to create a robot motion program, where dual hand detection in the images is an integral part.

The Pick step begins at a start box 602. At box 604, the workpieces and hands are detected in images from the camera 310. The dual hand detection method described in detail above is used in the box 604. The position and orientation of a workpiece coordinate frame are determined from analysis of the workpieces in the images, and the position and orientation of a corresponding hand coordinate frame are determined from analysis of the hands in the images.

At decision diamond 606, for each hand, it is determined if the fingertips (thumb tip 114 and forefinger tip 118 of FIG. 1) have contacted the workpiece. This is determined from the camera images. When the fingertips have contacted the workpiece, the grasping pose and position of the workpiece and the hand are recorded at box 608. It is important that the pose and position of the hand relative to the workpiece are identified; that is, the position and orientation of the hand coordinate frame and the workpiece coordinate frame must be defined relative to some global fixed reference frame such as a work cell coordinate frame. This allows the controller to determine how to position the gripper to grasp a workpiece in a later replay phase. This analysis of workpiece contact is performed for each of the right and left hands.

After the grasping pose and position of the workpiece and the hand are recorded at the box 608, the Pick step ends at an end box 610. The process then proceeds to the Move step, which begins at box 622. The Move step can be carried out for each hand separately. At box 624, the workpiece is detected in camera images. At decision diamond 626, if the workpiece is not detected in the camera images, the process loops back to the box 624 to take another image. When the workpiece is detected in a camera image, the workpiece position (and optionally pose) is recorded at box 628.

At box 634, the hand (either hand—whichever one is performing the current move operation) is detected in camera images. At decision diamond 636, if the hand is not detected in the camera images, the process loops back to the box 634 to take another image. When the hand is detected in a camera image, the hand position (and optionally pose) is recorded at box 638. When both the workpiece position (from the box 628) and the hand position (from the box 638) are detected and recorded from the same camera image, the hand position and the workpiece position are combined and recorded at box 640. Combining the hand position and the workpiece position may be accomplished by simply taking the mean of the two; for example, if the midpoint between the thumb tip 114 and the forefinger tip 118 should coincide with the center/origin of the workpiece, then a mean location can be computed between the midpoint and the workpiece center.

Multiple positions along the Move step are preferably recorded to define a smooth Move path, by repeating the activities from the Start Move box 622 through the Combine Hand & Workpiece Position box 640. After the hand position and the workpiece position are combined and recorded at the box 640, and no more Move step positions are needed, the Move step ends at an end box 642. The process then proceeds on to the Place step, which begins at box 662.

At box 664, the position of the workpiece is detected in images from the camera 310. At decision diamond 666, it is determined if the workpiece is found in the camera images and if the workpiece is stationary. Alternately, it could be determined whether the fingertips have broken contact with the workpiece. When the workpiece is determined to be stationary, and/or the fingertips have broken contact with the workpiece, the destination pose and position of the workpiece are recorded at box 668. The Place step and the entire process of the teaching phase end at an end box 670.

The robot teaching process described in the flowchart diagram 600 of FIG. 6 relies on robust detection of human hand pose in images. When the human demonstration includes the use of both hands, the dual hand detection method and system of FIGS. 3-5 is an essential part.

Figure 7:
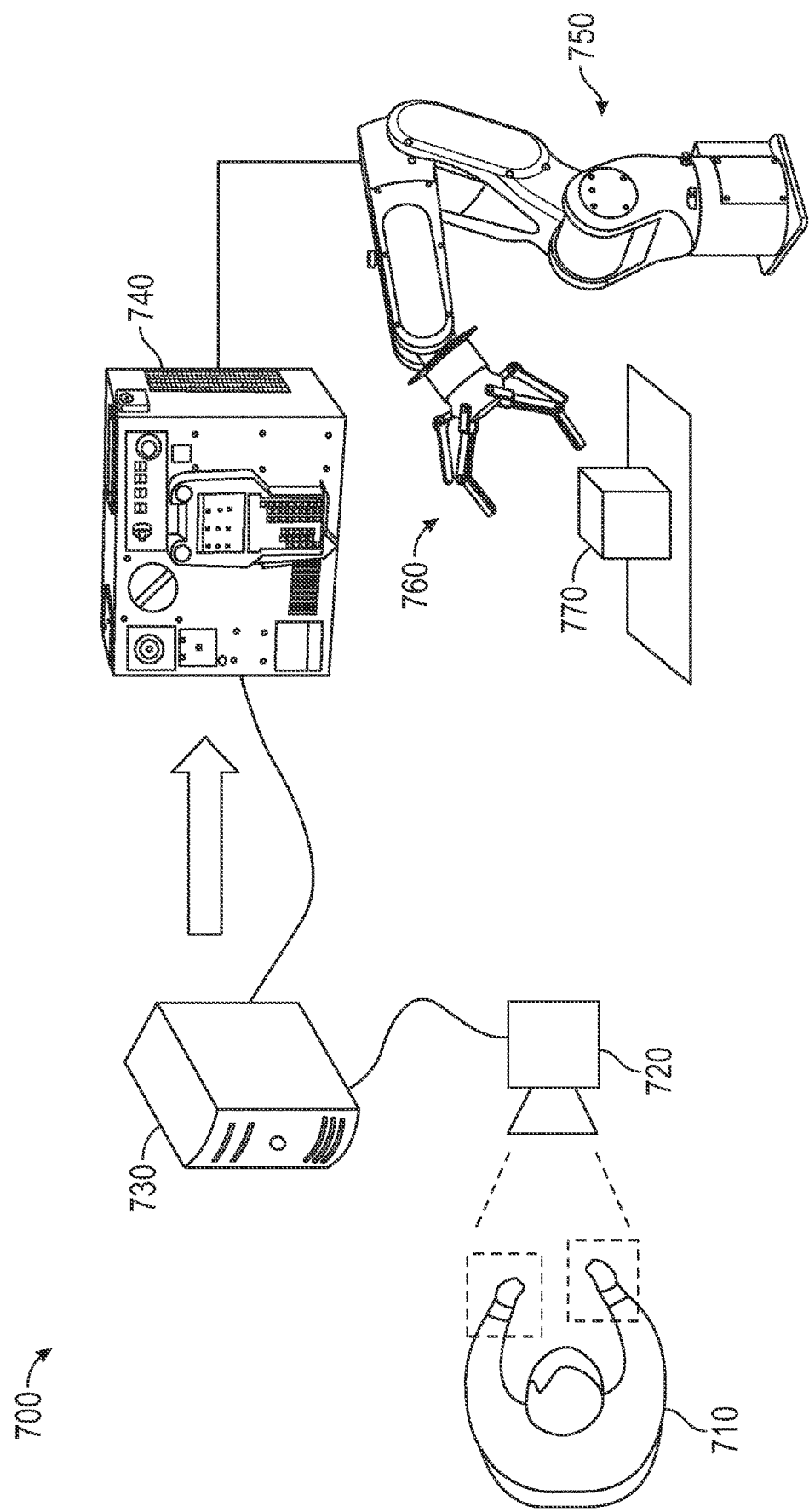
FIG. 7 is an illustration of a system for robot operation based on teaching by human demonstration using both hands, according to an embodiment of the present disclosure.

FIG. 7 is an illustration of a system 700 for robot operation based on teaching by human demonstration using both hands, according to an embodiment of the present disclosure. A human demonstrator 710 is in a position where a camera 720 can capture images of the demonstrator's hands and the workpieces on which the operation is being performed. The camera 720 corresponds with the camera 310 of FIG. 3. The camera 720 provides the images to a computer 730 which analyzes the images to identify the 3D wireframe coordinates of the hands, along with the corresponding workpiece positions, as described in detail above. The analysis by the computer 730 includes the dual hand detection method shown in FIGS. 3-5.

The human demonstrator 710 demonstrates the complete operation—such as the assembly of multiple components into a finished device. The camera 720 provides a continuous stream of images, and the computer 730 analyzes the images and records robot teaching commands as identified. Each teaching step includes a gripper pose computed from a hand pose, and a corresponding workpiece position/pose. This recording of teaching steps includes grasping and placement operations performed by either or both hands of the human demonstrator 710.

When the robot operation is completely defined from the human demonstration, the robot program is transferred from the computer 730 to a robot controller 740. The controller 740 is in communication with a robot 750. The controller 740 computes robot motion commands to cause the robot 750 to move its gripper 760 to the position and orientation of the gripper coordinate frame identified from the images. The robot 750 moves the gripper 760 relative to a workpiece 770 according to the sequence of commands from the controller 740, thereby completing the operation which was demonstrated by the human demonstrator 710.

The scenario of FIG. 7 is that the gripper 760 is to grasp the workpiece 770 and perform some operation with the workpiece 770—such as moving the workpiece 770 to a different position and/or pose. The gripper 760 is shown as a finger-type gripper, but may instead be a suction cup or magnetic surface gripper as described earlier.

The system 700 of FIG. 7 may be used in two different modes. In one mode, the human demonstrator teaches all of the steps of an operation—such as device assembly—one time in advance, and then the robot performs the assembly operation repeatedly based on the component movement instructions which were taught by the human demonstration. In another mode known as teleoperation, the human demonstrator works in real-time collaboration with the robot—where each action of a hand grasping and moving a part is analyzed and immediately executed by the robot, with visual feedback of the robot's motions to the human operator. Both of these modes of operation can benefit from the disclosed techniques for dual hand detection in human demonstration.

Throughout the preceding discussion, various computers and controllers are described and implied. It is to be understood that the software applications and modules of these computer and controllers are executed on one or more computing devices having a processor and a memory module. In particular, this includes the processors in the computer 730 and the robot controller 740 discussed above. Specifically, the processor in the computer 730 are configured to perform the dual hand detection in robot teaching via human demonstration in the manner discussed above.

As outlined above, the disclosed techniques for dual hand detection in robot teaching by human demonstration make robot motion programming faster, easier and more intuitive than previous techniques, providing reliable detection of both hands of the demonstrator while requiring only a single camera.

While a number of exemplary aspects and embodiments of dual hand detection in robot teaching by human demonstration have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for dual hand detection in images, said method comprising:
   providing an image including left and right hands of a human;
   analyzing the image, using a first neural network running on a computer having a processor and memory, to determine an identity and a location in the image of the left hand and the right hand;
   creating a left hand sub-image and a right hand sub-image, where each of the sub-images is cropped from the image;
   providing the sub-images to a second neural network running on the computer, including horizontally flipping either the left hand sub-image or the right hand sub-image;
   analyzing the sub-images by the second neural network to determine three-dimensional (3D) coordinates of a plurality of key points on the left and right hands; and
   using the 3D coordinates of the key points by a robot teaching program to define gripper poses, including horizontally flipping the coordinates of the key points on either the left hand or the right hand.

2. The method according to claim 1 wherein the image is provided by a two-dimensional (2D) digital camera.

3. The method according to claim 1 wherein the first neural network is trained to distinguish the left hand from the right hand in a training process where a plurality of training images are provided to the first neural network in which left and right hands are pre-identified.

4. The method according to claim 3 wherein the first neural network analyzes the training images to identify distinguishing characteristics of left hands and right hands, including curvature and relative locations of digits.

5. The method according to claim 1 wherein each of the sub-images is cropped to include the left or right hand within a predefined margin.

6. The method according to claim 1 wherein horizontally flipping either the left hand sub-image or the right hand sub-image includes horizontally flipping the left hand sub-image when the second neural network is trained using training images of right hands, and horizontally flipping the right hand sub-image when the second neural network is trained using training images of left hands.

7. The method according to claim 1 wherein the plurality of key points on the left and right hands include thumb tips, thumb knuckles, finger tips and finger knuckles.

8. The method according to claim 1 wherein horizontally flipping the coordinates of the key points on either the left hand or the right hand includes horizontally flipping the coordinates of the key points on the hand which had its sub-image flipped before analysis by the second neural network.

9. The method according to claim 8 wherein horizontally flipping the coordinates of the key points includes horizontally flipping the coordinates across a vertical plane to restore the coordinates to their position in the image.

10. The method according to claim 1 wherein the image also includes one or more workpieces, and the gripper poses and workpiece positions and poses are used by the robot teaching program to create workpiece pick-up and placement instructions for a robot.

11. The method according to claim 10 wherein the instructions are provided to a robot controller from the computer, and the robot controller provides control commands to the robot to perform workpiece operations.

12. A method for programming a robot to perform an operation by human demonstration, said method comprising:
demonstrating the operation on workpieces by a human using both hands;
analyzing camera images of the hands demonstrating the operation on the workpieces, by a computer, to create demonstration data including gripper poses computed from three-dimensional (3D) coordinates of key points of the hands, where the 3D coordinates of the key points are determined from the images by a first neural network used to identify left and right hands in the images and a second neural network used to compute the 3D coordinates in sub-images of the identified left and right hands;
generating robot motion commands, based on the demonstration data, to cause the robot to perform the operation on the workpieces; and
performing the operation on the workpiece by the robot.

13. The method according to claim 12 wherein the demonstration data includes, at a grasping step of the operation, position and orientation of a hand coordinate frame, a gripper coordinate frame corresponding to the hand coordinate frame, and a workpiece coordinate frame.

14. The method according to claim 12 wherein the first neural network is trained to distinguish the left hand from the right hand in a training process where a plurality of training images are provided to the first neural network in which left and right hands are pre-identified.

15. The method according to claim 12 wherein either the left hand sub-images or the right hand sub-images are horizontally flipped before being provided to the second neural network, and the 3D coordinates of the key points of the left hand or the right hand are horizontally flipped after being computed by the second neural network.

16. The method according to claim 15 wherein the left hand sub-images and the 3D coordinates of the key points of the left hand are horizontally flipped when the second neural network is trained using training images of right hands.

17. A system for dual hand detection in images used to program a robot to perform an operation by human demonstration, said system comprising:
a camera;
a computer having a processor and memory and in communication with the camera, said computer being configured to perform steps including;
analyzing an image including left and right hands of a human, using a first neural network, to determine an identity and a location in the image of the left hand and the right hand;
creating a left hand sub-image and a right hand sub-image, where each of the sub-images is cropped from the image;
providing the sub-images to a second neural network running on the computer, including horizontally flipping either the left hand sub-image or the right hand sub-image;
analyzing the sub-images by the second neural network to determine three-dimensional (3D) coordinates of a plurality of key points on the left and right hands; and
using the 3D coordinates of the key points to define gripper poses used to program the robot, including horizontally flipping the coordinates of the key points on either the left hand or the right hand.

18. The system according to claim 17 wherein the first neural network is trained to distinguish the left hand from the right hand in a training process where a plurality of training images are provided to the first neural network in which left and right hands are pre-identified, and where the first neural network analyzes the training images to identify distinguishing characteristics of left hands and right hands, including curvature and relative locations of digits.

19. The system according to claim 17 wherein horizontally flipping either the left hand sub-image or the right hand sub-image includes horizontally flipping the left hand sub-image when the second neural network is trained using training images of right hands, and horizontally flipping the right hand sub-image when the second neural network is trained using training images of left hands.

20. The system according to claim 19 wherein horizontally flipping the coordinates of the key points on either the left hand or the right hand includes horizontally flipping the coordinates of the key points on the hand which had its sub-image flipped before analysis by the second neural network.

* * * * *